(12) United States Patent
Lau

(10) Patent No.: US 6,501,486 B1
(45) Date of Patent: Dec. 31, 2002

(54) MULTIPLE LANGUAGE SUPPORT FOR COMPONENT-BASED SYSTEMS

(75) Inventor: Christina P. Lau, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/451,036

(22) Filed: Nov. 29, 1999

(30) Foreign Application Priority Data

Nov. 30, 1998 (CA) .............................................. 2225020

(51) Int. Cl.$^7$ ................................................. G06F 9/45
(52) U.S. Cl. ........................... 345/762; 345/765; 717/39
(58) Field of Search .................................. 345/765, 762, 345/764, 967, 968, 839, 835; 217/1, 2, 4, 35, 39

(56) References Cited

U.S. PATENT DOCUMENTS 6,083,276 A * 7/2000 Davidson et al. .............. 717/1
6,192,511 B1 * 2/2001 Johnston et al. ............... 717/4
6,237,135 B1 * 5/2001 Timbol .......................... 717/1

* cited by examiner

*Primary Examiner*—Cao H. Nguyen
(74) *Attorney, Agent, or Firm*—F. Chau&Associates, LLP

(57) ABSTRACT

A computer system for multiple language support in a component-based system having a graphical interface for object creation. The created objects having a CORBA-compliant IDL definition. The system mapping the created objects, including system-defined objects, from their IDL definitions to programming language-specific implementations for each of the programming languages supported by the computer system. The computer system persistently storing the programming language implementations and using and displaying the language specific implementation specified by the user.

14 Claims, 4 Drawing Sheets

MULTIPLE LANGUAGE SUPPORT FOR COMPONENT-BASED SYSTEMS

FIELD OF THE INVENTION

The present invention is directed to an improvement in computing systems and in particular to a computer system providing for multiple language support for component-based systems.

BACKGROUND OF THE INVENTION

Recent developments in computing have led to the development of component-based systems. Component-based systems are intended to permit software components to be designed, implemented and used across different computers and platforms. Typically, component-based systems include request broker software which enables communication between components. Such systems also permit development of software for the component-based systems. Object-oriented software is a common choice of use in building component-based systems themselves, as well as the software which make up the components in the systems.

A standard which has been developed for component-based systems is the Common Object Request Broker Architecture (CORBA) standard. CORBA defines objects and interfaces. The interface for objects in the CORBA architecture is specified by the Interface Definition Language (IDL). Objects specified by an IDL description may be used by other objects without knowledge of how those objects are implemented. Systems built using the CORBA architecture are able to include object-oriented, distributed software.

Systems which support component software, such as those which adhere to the CORBA architecture, typically include user interfaces which permit the user to develop objects for the component-based environment. Advantageously, such systems will include tools which assist the user by providing object-oriented frameworks or other system-generated objects which may provide a starting point or otherwise assist the user in the development of new objects for the component-based system. Because the component-based model permits software written in different languages to be integrated into a single system, the system which supports software development for a component-based system need not be specific to a given programming language.

It is therefore desirable to have a computer system which is capable of permitting users to develop software for component-based systems which supports multiple languages for the component based system.

SUMMARY OF THE INVENTION

According to one aspect of the present invention, there is provided an improved system for supporting multiple languages in component-based systems.

According to another aspect of the present invention, there is provided a computer program product for multiple language support in a component-based system, having a user interface permitting a user to create a set of created objects for use in the component-based system, each created object having a high-level definition independent of programming implementation languages, the user interface further permitting a user to select a programming language, from one of a number of supported languages, for implementation of the set of created objects, a pre-defined set of mapping objects, each mapping object providing a mapping from the high-level definitions of the created objects to a language-specific object implementation in a one of the number of supported languages, one or more system objects for selecting for use in the system, and for displaying to the user, the programming language-specific implementation of the set of created objects for the language selected by the user, whereby for each created object in the set of created objects, each one of the set of mapping objects maps the high-level definition of the object to a programming language-specific object implementation which is persistently stored.

According to another aspect of the present invention, there is provided a computer program product as described above in which the high-level definition of the created objects is provided in the Interface Definition Language of the Common Object Request Broker Architecture and in which the set of mapping objects includes mapping objects for mapping from the Interface Definition Language to a Java programming language implementation and from the Interface Definition Language to a C++ programming language implementation following the Object Management Group Interface Definition Language to Java and to C++ Language Mapping Specifications, respectively.

According to another aspect of the present invention, there is provided a computer program product as described above in which each high-level created-object definition is represented by a tree structure, each node of which comprises a high-level type definition including one or more of an attribute type, a method return type, and a method parameter type, and in which each mapping object traverses the tree structure to map the high-level type definitions in the tree structure to programming language specific type definitions.

According to another aspect of the present invention, there is provided a computer program product as described above in which the computer program product includes a computer usable medium having computer readable program code embodied in the medium.

According to another aspect of the present invention, there is provided a method for providing multi-language support in a component-based computer system, the method having the steps of permitting a user to create a set of created objects for use in the component-based system, each created object having a definition in the Interface Definition Language of the Common Object Request Broker Architecture, permitting a user to select a programming language, from one of a number of supported languages, for implementation of the set of created objects, providing a mapping based on the Object Management Group mapping specifications for each of the created objects, from the definition in the Interface Definition Language of the Common Object Request Broker Architecture for the created objects to a language-specific object implementation in each one of the number of supported languages, selecting for use in the system, and for displaying to the user, the programming language-specific implementations of the set of created objects for the language selected by the user.

According to another aspect of the present invention, there is provided an article of manufacture including a computer usable medium having computer readable program code embodied therein for multi-language support in a component-based system, the computer readable program code in said article of manufacture including computer readable program code for causing a computer to carry out the steps in the method described above.

Advantages of the present invention include the ability to generate implementations of language-specific objects without requiring the user to design the language-specific implementation. Language dependent features of objects in the component-based system may be hidden from the user. The user may also select different language implementations for the object. The system may maintain implementations for all supported languages for the object and the user may change the implementation if desirable.

BRIEF DESCRIPTION OF THE DRAWINGS

The preferred embodiment of the invention is shown in the drawings, wherein.

Figure 1:
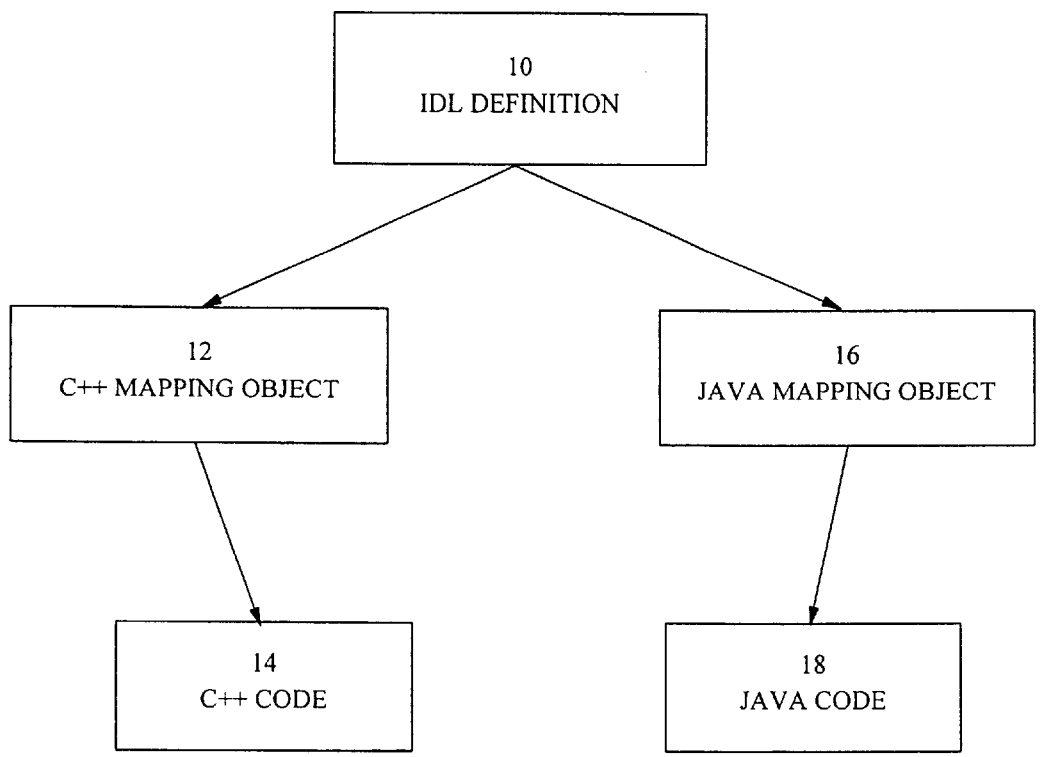
FIG. 1 is a block diagram showing the relationship between an interface definition and language-specific code as provided for by the preferred embodiment.

In the drawings, the preferred embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

Referring to FIG. 1, there is shown in a block diagram view, a high level representation of the system showing an example of multi-language code generation in accordance the preferred embodiment.

The preferred embodiment is described with reference to the IBM Component Broker (trade-mark) system. However, it will be understood by those skilled in the art that the invention may be implemented with respect to other environments using the CORBA architecture. These aspects of the system will be described generally below. It will be apparent to those skilled in the art that different object-oriented systems which are CORBA-compliant are possible and the preferred embodiment will be adaptable to such different systems, as well as to systems which are not CORBA-compliant but which rely on a common interface definition language.

The system of the preferred embodiment is a CORBA-compliant system for component-based software development. The system of the preferred embodiment provides the user with a graphical interface to define objects in an object-oriented component-based system. The user is able to define objects for the component based system and establish the relationships between the objects. The user may also define methods and attributes for objects which the user has defined.

In addition to objects which are user-defined, the system of the preferred embodiment also provides certain system-defined objects which are created by the system to enable the software being developed to operate effectively in the CORBA architecture. Examples of such system-defined objects are provided below.

When the user defines objects using the graphical interface of the system of the preferred embodiment, the system generates an interface definition in the CORBA standard Interface Definition Language (IDL) and which is represented by IDL definition 10 in FIG. 1. Examples of the types of properties of an interface which can be defined by a user and which are represented by IDL definitions are: attribute, method, enum, struct, exceptions, union and constant.

By defining objects and their relationships at a level which may be expressed in terms of IDL constructs (in effect, defining objects by defining their interfaces) the user is able to define aspects of the software being designed without reference to the underlying language-specific details.

Once an interface as specified by an IDL definition for an object has been specified by a user, the system maps (as described below) the IDL definition into programming language-specific code for the object. Where necessary, the user may then write language-specific code to complete the definition of the object. Where the system has generated the object, the system itself will provide language-specific code, where required.

The object-oriented system of the preferred embodiment defines a class which maps IDL definitions of object interfaces into language-specific code. As shown in general in FIG. 1, and as described in further detail below, C++ mapping object 12 traverses IDL definition 10 to produce C++ code 14. Similarly, Java mapping object 16 traverses IDL definition 10 to produce Java code 18. In the preferred embodiment described the system supports C++ and Java languages. As will be apparent to those skilled in the art, the preferred embodiment may be extended to support other languages.

An example of code generation for different implementation languages requiring different mapping transformations follows. The mapping transformation of the preferred embodiment transforms a type declaration expressed in the language neutral IDL form, to the specific language implementation format. To generate C++ code 14, an IDL type "long" in IDL definition 10 will be transformed into "::CORBA::Long" in C++ code 14. Similarly, an IDL type "CosStream::StreamIO" in IDL definition 10 is transformed into "::CosStream::StreamIO_ptr" in C++ code 14. The transformation carried out by the C++ mapping object is based on the IDL to C++ Language Mapping Specifications defined for CORBA by the Object Management Group (OMG).

To generate the Java code 18, a similar transformation is required. Continuing with above example, an IDL type "long" in the IDL definition 10 is transformed into "int" in Java code 18. An IDL type "CosStream::StreamIO" in element definition in IDL 10 is transformed into "org.omg-.CosStream.StreamIO". Both of these transformations are based on the OMG IDL to Java Language Mapping Specifications.

As may be seen from the above examples, the system implements classes which are defined to carry out the transformation from a given IDL definition of an interface to the language-specific definitions required by the system. To add other languages to the preferred embodiment, other classes are defined to implement the appropriate OMG-defined Language Mapping Specification.

Figure 2:
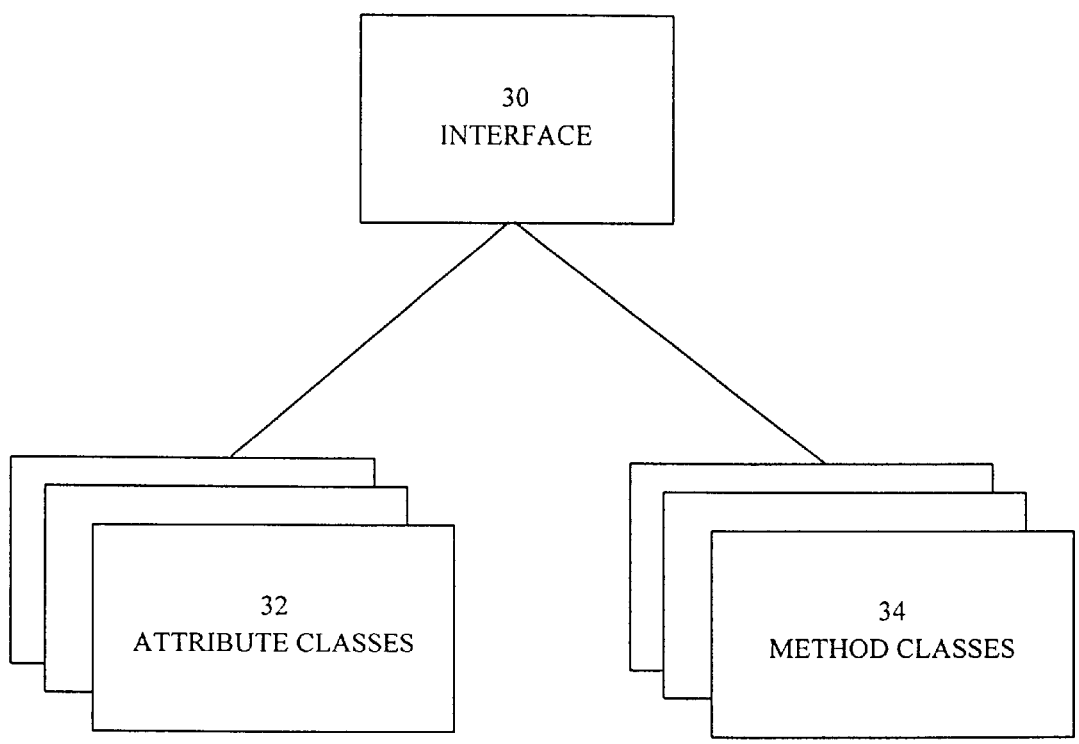
FIG. 2 is a block diagram showing the relationship between an interface and attributes and methods of the interface.

The system of the preferred embodiment utilizes an object-oriented meta-model to model the interface IDL definitions. FIG. 2 illustrates, in block diagram view, an example of the meta-model for an IDL interface 30 having potentially multiple attribute classes 32 and method classes 34. Other properties of the IDL interface such as enum, struct, exceptions, union and constant may also be included in the meta-model for interface definitions but are not present in the example of FIG. 2.

Figure 3:
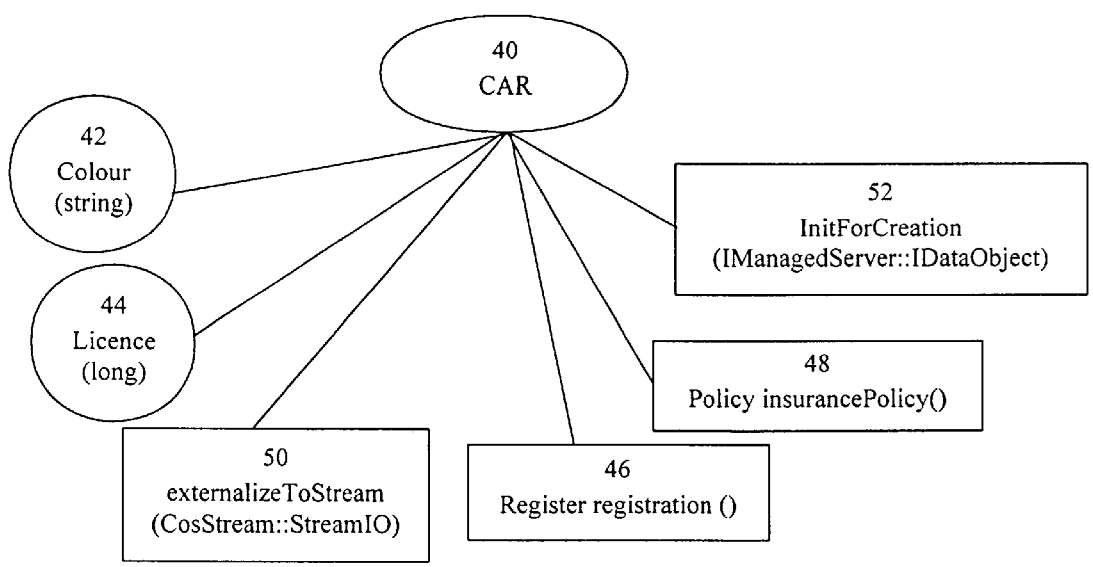
FIG. 3 is a block diagram showing an example of an interface and defined attributes and methods.

As is described above from the user perspective, the system of the preferred embodiment initially populates the classes of the meta model with IDL definition data reflecting the user input in creating objects. For example, the interface 30 may contain the name of the interface. In FIG. 3, a block diagram shows the structure of an example object 40, corresponding to a meta-model interface such as interface 30 in FIG. 2. In the FIG. 3 example, the name for object 40 is "CAR".

The attribute classes 32 of FIG. 2 contain the attributes for the class. Each attribute includes the name of the attribute and its type. In the example of FIG. 3, object 40 has attributes 42, 44. The name of attribute 42 is "Colour" and the name of attribute 44 is "Licence". The types of attributes 42, 44 are string and long, respectively.

As shown in FIG. 2, interface 30 also contains method classes 34, each of which contains a name, a return type, and parameters. Both methods specific to the interface 30 (user-defined methods) and methods defined by the system of the preferred embodiment (methods provided by the framework of the system of the preferred embodiment) are included in method classes 34. In FIG. 3, user defined methods 46, 48, (registration( ) and insurancePolicy( )as well as system-defined methods 50, 52 (initForCreation( ), externalizeToStream( )) are shown.

As can be seen from FIGS. 2 and 3, the system of the preferred embodiment permits the user to define objects using a model which is defined at a simple and implementation-language neutral level. Object 40 in FIG. 3 can be defined by the user in some detail but the definition is expressable in IDL and is therefore implementation-language independent.

Returning to FIG. 1, the IDL definition 10 is the IDL code corresponding to an object's structure, such as that structure which is shown in FIG. 3. For the system of the preferred embodiment to translate IDL definition 10 into language-specific code, the object of the appropriate mapping class (C++ mapping object 12 or Java mapping object 16 in the example of FIG. 1) traverses the structure which defines the object (for example, the tree as represented in FIG. 3).

For each object defined by the user (and therefore for each IDL interface), the mapping object invokes a mapping method defined in the class on each attribute, method return type, and parameter type. The mapping method resolves what the type of the corresponding IDL definition component is, and computes the transformation based on the OMG Specifications. The transformation is then stored in a string that corresponds to the attribute, or method return type, or parameter type.

Where the structure includes system-defined methods, the system also generates the language-specific code for the system-defined methods.

In the example of FIG. 3, the type which is parsed by the mapping method is string for attribute 42, long for attribute 44, is return type Register and Policy for methods 46, 48 and is parameter type CosStream::StreamIO for method 50 and IManagedServer::IDataObject for method 52.

The C++ mapping object 12 will take the above types as input and generate the appropriate C++ code, as specified in the OMG Specifications. Similarly for the Java mapping object 16. Table 1 shows the types found in FIG. 3, and the corresponding transformations as carried out by the two mapping objects.

TABLE 1

| IDL | C++ | Java |
|---|---|---|
| string | char* | String |
| long | long | int |
| Register | ::Register__ptr | Register |
| CosStream::StreamIO | ::CosStream::StreamIO_ptr | org.omg.CosStream.StreamIO |
| Policy | ::Policy__ptr | Policy |
| IManagedServer:: | ::ManagedServer:: | com.ibm.IManagedServer. |
| IDataObject | IDataObject__ptr | IDataObject |

As indicated above, the system will also generate language-specific code for system-defined methods. In the example of FIG. 3, the system-defined method initForCreation will result in the following example of C++ code:

```
::CORBA::Void CarBO_Impl::initForCreation
    (::IManagedServer::IDataObject_ptr theDO)
{
    iDataObject=ClaimDO::_narrow(theDO);
    ClaimBO_Impl::initializeState( );
}
```

Similarly, for the Java language, the method will be implemented in the following equivalent Java code:

```
public void initForCreation
    (com.ibm.IManagedServer.IDataObject theDO)
{
    iDataObject=ClaimDoHelper.narrow(theDO);
    initalizeState( );
}
```

In this manner the system of the preferred embodiment generates language-dependent versions of the system-generated methods which are required.

The system of the preferred embodiment transforms the IDL representations of the interfaces defined by the user into language-specific code for all languages supported by the system. As indicated above, in this example of FIG. 3, the languages are C++ and Java.

Figure 4:
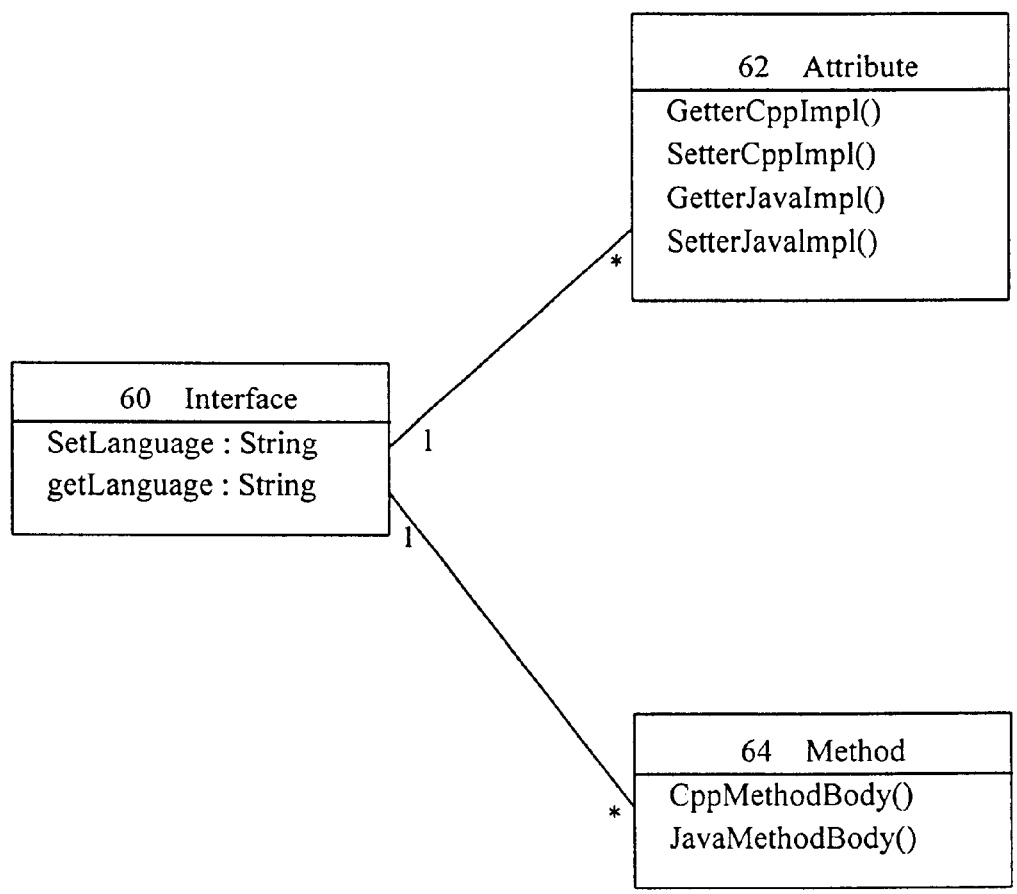
FIG. 4 is a block diagram showing an example relationship between the interface class and its attribute and method classes containing methods for retrieval of computed code.

The language-specific code is stored in the meta-model as shown in FIG. 4.

The interface class 60 is shown with methods to get and set the language for the interface. This defines the implementation language which the user has specified for the given object represented by the interface. The attribute class 62 has get and set methods for the attribute in both C++ (GetterCppImpl( ) and SetterCppImpl( )) and Java (GetterJavaImpl( ) and SetterJavaImpl( )). Similarly, the method class 64 has methods which return the code for the method for C++ (CppMethodBody( )) and for Java (JavaMethodBody( )).

With reference to the example of FIG. 3, the getter and setter implementations for attribute licence (attribute 44 in FIG. 3), is defined in the following manner in C++:

Getter:
```
::CORBA::Long Car_Impl::licence( )
{
    return iLicence;
}
```
Setter:
```
::CORBA::Long Car_Impl::licence(::CORBA::Long
    Licence)
{
    iLicence=licence;
}
```

As shown in this example, this approach provides the system with the mechanism to store the attributes and methods for the interfaces defined by the user. Other properties of the interface are similarly stored by the system of the preferred embodiment. A similar implementation will be carried out for getter and setter methods in Java.

As the above indicates, the system of the preferred embodiment results in the user being able to initially define the objects in a system at a level which is language-independent. As described above, the system itself is able (using the mapping objects for the appropriate languages), having only the IDL definitions of the objects, to create IDL-defined language-specific implementations of the objects for the different languages supported by the system. The system stores these implementations persistently.

This provides the user with the option of selecting the language of the object implementation without being concerned with the details of that implementation, at least initially. In addition, the persistence of the implementation of all supported languages means that users can alter the implementation language of an object. If the change to a different language is with respect to a system defined object, or to an object which is completely defined by an IDL, the code will be stored already in the system and the change will be a substitution of one language implementation for another. If the change is for a user defined object, the IDL definition code for the newly selected language will exist and the user will have to translate only those aspects of the object not derived from the IDL definition. Any errors in translating from one language to another will be constrained by the code which is pre-existing and which corresponds to the IDL definition. These and other advantages are a result of the design of the preferred embodiment in supporting multiple languages in a component-based environment.

Although a preferred embodiment of the present invention has been described here in detail, it will be appreciated by those skilled in the art, that variations may be made thereto, without departing from the spirit of the invention or the scope of the appended claims.

The embodiments of the invention in which an exclusive property or privilege is claimed are defined as follows:

1. A computer program product for multiple language support in a component-based system, comprising
   a user interface permitting a user to create a set of created objects for use in the component-based system, each created object having a high-level definition independent of programming implementation languages,
   the user interface further permitting a user to select a programming language, from one of a number of supported languages, for implementation of the set of created objects,
   a pre-defined set of mapping objects, each mapping object providing a mapping from the high-level definitions of the created objects to a language-specific object implementation in a one of the number of supported languages,
   one or more system objects for selecting for use in the system, and for displaying to the user, the programming language-specific implementation of the set of created objects for the language selected by the user,
   whereby for each created object in the set of created objects, each one of the set of mapping objects maps the high-level definition of the object to a programming language-specific object implementation which is persistently stored.

2. The computer program product of claim 1 in which the high-level definition of the created objects is provided in the Interface Definition Language of the Common Object Request Broker Architecture.

3. The computer program product of claim 2 in which the set of mapping objects comprises a mapping object for mapping from the Interface Definition Language to a C++ programming language implementation following the Object Management Group Interface Definition Language to C++ Language Mapping Specifications.

4. The computer program product of claim 2 in which the set of mapping objects comprises a mapping object for mapping from the Interface Definition Language to a Java programming language implementation following the Object Management Group Interface Definition Language to Java Language Mapping Specifications.

5. The computer program product of claim 2 in which each Interface Definition Language created-object definition is represented by a tree structure, each node of which comprises an Interface Definition Language type definition including one or more of an attribute type, a method return type, and a method parameter type, and in which each mapping object traverses the tree structure to map the Interface Definition Language type definitions in the tree structure to programming language specific type definitions.

6. The computer program product of claim 1 in which the set of created objects comprises objects which are defined by the component-based system.

7. The computer program product of claim 1 in which the user interface is a graphical user interface which provides for created object definition.

8. The computer program product of claim 1 in which each high-level created-object definition is represented by a tree structure, each node of which comprises a high-level type definition including one or more of an attribute type, a method return type, and a method parameter type, and in which each mapping object traverses the tree structure to map the high-level type definitions in the tree structure to programming language specific type definitions.

9. The computer program product of claim 1, in which the user interface selectively prompts for and accepts user input for selection between persistently stored language-specific object implementations.

10. The computer program product of claim 1, in which the user interface selectively permits the user to add user-defined language-specific code to persistently stored language-specific object implementations.

11. A computer program product for use with a component-based computer system, said computer program product comprising: a computer usable medium having computer readable program code embodied in said medium for multi-language support said computer program product comprising:
   computer readable program code for causing a computer to permit a user to create a set of created objects for use in the component-based system, each created object having a high-level definition independent of implementation languages
   computer readable program code for causing said computer to permit a user to select a language, from one of a number of supported languages, for implementation of the set of created objects,
   computer readable program code for causing said computer to provide a mapping from the high-level definition of each of the created objects to a persistently stored language-specific object implementation in each of the number of supported languages
   and computer readable program code for causing said computer to select for use in the component-based system, and for displaying to the user, the programming language-specific implementation of the set of created objects for the language selected by the user.

12. A component-based computer system comprising
a user interface permitting a user to create a set of created objects for use in the component-based system, each created object having a definition in the Interface Definition Language of the Common Object Request Broker Architecture, the user interface further permitting a user to select a programming language, from one of a number of supported languages, for implementation of the set of created objects, a pre-defined set of mapping objects, each mapping object providing a mapping from the Interface Definition Language of the Common Object Request Broker Architecture of the created objects to a language-specific object implementation in a one of the number of supported languages, whereby each one of the set of the mapping objects comprises a mapping based on the Object Management Group mapping specifications, one or more system objects for selecting for use in the system, and for displaying to the user, the programming language-specific implementation of the set of created objects for the language selected by the user, whereby for each created object in the set of created objects, each one of the set of mapping objects maps the high-level definition of the object to a programming language-specific object implementation which is persistently stored.

13. A method for providing multi-language support in a component-based computer system, the method comprising the steps of permitting a user to create a set of created objects for use in the component-based system, each created object having a definition in the Interface Definition Language of the Common Object Request Broker Architecture, permitting a user to select a programming language, from one of a number of supported languages, for implementation of the set of created objects, providing a mapping based on the Object Management Group mapping specifications for each of the created objects, from the definition in the Interface Definition Language of the Common Object Request Broker Architecture for the created objects to a language-specific object implementation in each one of the number of supported languages, and selecting for use in the system, and for displaying to the user, the programming language-specific implementations of the set of created objects for the language selected by the user.

14. An article of manufacture comprising:

a computer usable medium having computer readable program code embodied therein for multi-language support in a component-based system, the computer readable program code in said article of manufacture comprising:
  computer readable program code for causing a computer to carry out the steps in the method of claim 13.

* * * * *